US008332253B1

(12) United States Patent
Farmer et al.

(10) Patent No.: US 8,332,253 B1
(45) Date of Patent: Dec. 11, 2012

(54) JUST IN TIME WORKFLOW CONSTRUCTION

(75) Inventors: John L. Farmer, Santa Maria, CA (US); Joseph Ternasky, Mountain View, CA (US); Matthew A. Wormley, San Luis Obispo, CA (US); Vijay Sadanand Ghaskadvi, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1392 days.

(21) Appl. No.: 11/460,601

(22) Filed: Jul. 27, 2006

(51) Int. Cl.
*G06Q 10/00* (2006.01)
(52) U.S. Cl. ........................................ 705/7.27; 705/301
(58) Field of Classification Search .................. 705/7.27, 705/301
See application file for complete search history.

(56) References Cited

U.S. PATENT DOCUMENTS

| 2002/0138436 A1* | 9/2002 | Darling ........................... 705/51 |
| 2003/0004771 A1* | 1/2003 | Yaung ............................... 705/8 |
| 2003/0177070 A1* | 9/2003 | Viswanath et al. ............. 705/26 |
| 2003/0236689 A1* | 12/2003 | Casati et al. ...................... 705/7 |
| 2004/0148214 A1* | 7/2004 | Aziz et al. ......................... 705/8 |
| 2004/0148299 A1* | 7/2004 | Teegan et al. .................. 707/100 |
| 2006/0069733 A1* | 3/2006 | Antonoff et al. .............. 709/206 |

OTHER PUBLICATIONS

Keyflow product summary, published Jun. 17, 2004 and downloaded on Jul. 21, 2010 from http://web.archive.org/web/20040617173418/www.keyfile.com/products/lexign_flow.htm.*
Keyflow DataSheet, published Jun. 18, 2004 and downloaded on Jul. 21, 2010 from Keyflow DataSheet: http://web.archive.org/web/20040618065710/www.keyfile.com/products/Keyflow.pdf.*
Keyflow product summary, published Jun. 17, 2004 and downloaded on Jul. 21, 2010 from http://web.archive.org/web/20040617173418/www.keyfile.com/products/lexign_flow.htm, 3pgs.*
Keyflow (product summary), published Jun. 17, 2004 and downloaded on Jul. 21, 2010 from http://web.archive.org/web/20040617173418/ www.keyfile.com/products/lexign_flow.htm).*
Christine Spencer, Streamline document reviews with an electronic routing slip. Inside Corel WordPerfect Suite; Aug. 2005; 11, 8; ProQuest Computing, pp. 4-5.*
Heslop, Brent, et al., "Microsoft® Word 2000 Bible," © 1999, IDG Books Worldwide, Inc., pp. 646-647.
Microsoft Press, "Microsoft® Word 2000 Self-Study Kit," © 1999 by Catapult, Inc., pp. 376-380.
Crumlish, Christian, "Word for Busy People™," © 1999 by The McGraw-Hill Companies, pp. 174-177.

* cited by examiner

*Primary Examiner* — Lynda Jasmin
*Assistant Examiner* — Timothy Padot
(74) *Attorney, Agent, or Firm* — Fish & Richardson P.C.

(57) ABSTRACT

Methods, systems, and apparatus, including computer program products for handling a workflow within an electronic document. Participants are chosen for the workflow and the activities are assigned to the workflow participants. Workflow information is obtained from an electronic document, where the workflow information pertains to activities assigned to a user. The user can consult on or delegate the assigned activities, in which case the electronic document is sent to the consultant or delegate. Alternatively the user can reassign future activities. If it is detected that the workflow has been completed, the user can indicate the continuing of the workflow by identifying additional workflow participants, and the electronic document is sent to one of the additional workflow participants.

10 Claims, 13 Drawing Sheets

JUST IN TIME WORKFLOW CONSTRUCTION

BACKGROUND

This disclosure relates to routing documents electronically using embedded workflow information.

Routing documents within a company is a part of everyday business processes, whether the documents are substantive, like engineering drawings, or administrative, like requests for paid time off or requests for office supplies. Historically, documents were all routed on paper. Companies can save money and increase productivity by routing documents electronically using a centralized workflow server, rather than on paper. This eliminates the need for error-prone and expensive manual data entry of paper forms by supporting the automatic transfer of data into database systems. Users can track the progress of electronic documents, ensuring that the documents cannot be lost, and can set up non-linear workflows, ensuring that the documents cannot be mislaid when employees retire or go on vacation. Centralized workflow servers are ideal for large companies desiring to improve efficiency. However, the servers may be expensive and can require some expertise to set up and operate, which can put automated workflow out of reach of small companies.

SUMMARY

In general, one aspect of the subject matter described in this specification can be embodied in a method that includes receiving user input to initiate a workflow with an electronic document. User input is received to choose one or more activities for the workflow, wherein each of the one or more activities is of a kind that can be performed on the electronic document. User input is received to choose one or more workflow participants. User input is received to assign the activities to the workflow participants. A schedule of the assigned activities and the workflow participants is incorporated into the electronic document. Other embodiments of this aspect feature corresponding systems and computer program products.

These and other embodiments can optionally include one or more of the following features. A workflow is reused from an archived electronic document. Confirmation is received from the user to automatically reuse the workflow from the archived electronic document if the electronic document is similar to the archived electronic document.

In general, another aspect of the subject matter described in this specification can be embodied in a method that includes receiving directly or indirectly an electronic document from an initiating workflow participant. Workflow information is obtained from the electronic document, the workflow information pertaining to at least one activity assigned to a user. User input is received specifying to consult on or delegate the assigned activity. The workflow information is updated to indicate that the assigned activity was consulted on or delegated. If the user input indicates consulting on the assigned activity, user input is received to identify a consultant, the electronic document is sent to the consultant, and a second version of the electronic document is received from the consultant, wherein the second version reflects that the assigned activity has been performed. If the user input indicates delegating the assigned activity, user input is received to identify a delegate, and the electronic document is sent to the delegate. Other embodiments of this aspect feature corresponding systems and computer program products.

These and other embodiments can optionally include one or more of the following features. The workflow information is participant declarations and activity declarations stored as embedded routing metadata in the electronic document. The workflow information is presented to the user. At least one workflow participant is an initially unbound role, and the role is subsequently bound to a computer program workflow participant or a non-computer program workflow participant, whereby all instances of that role in the electronic workflow are assigned to the same computer program or human. After the electronic document is sent, a status notification is transmitted that the electronic document has been sent and to whom to at least one of: a local area network server, an application service provider, or peers in a network.

In general, another aspect of the subject matter described in this specification can be embodied in a method that includes receiving directly or indirectly an electronic document from an initiating workflow participant. Workflow information is obtained from an electronic document, the workflow information pertaining to one or more activities assigned to one or more workflow participants. User input is received to reassign one of the assigned activities to a different workflow participant. Workflow information is written to the electronic document indicating that the user reassigned an activity. Other embodiments of this aspect feature corresponding systems and computer program products.

In general, another aspect of the subject matter described in this specification can be embodied in a method that includes receiving directly or indirectly an electronic document from an initiating workflow participant. Workflow information is obtained from the electronic document, the workflow information pertaining to one or more activities assigned to a user. It is detected that the one or more assigned activities have been completed. The workflow information is updated to indicate that the one or more assigned activities have been performed. User input is received indicating ending a workflow or continuing the workflow. If the user input indicates ending the workflow, the electronic document is sent to the initiating workflow participant. If the user input indicates continuing the workflow, user input is received to identify one or more additional workflow participants, and sending the electronic document to at least one of the additional workflow participants. Other embodiments of this aspect feature corresponding systems and computer program products.

These and other embodiments can optionally include one or more of the following features. The workflow information is participant declarations and activity declarations stored as embedded routing metadata in the electronic document. The workflow information is presented to the user. The user is a past workflow participant. At least one of the past workflow participants is one or more executing computer programs; and at least one computer program is operable to integrate information from the electronic document into a database. The electronic document is a form; at least one of the assigned activities is accepting data for the form; and performing the assigned activities comprises accepting data for the form. At least one of the assigned activities is attaching a second electronic document; and performing the assigned activities comprises attaching the second electronic document. At least one of the assigned activities is receiving user input indicating approval of the electronic document; and performing the assigned activities comprises receiving user input indicating approval of the electronic document. At least one of the assigned activities is receiving user input comprising comments on the electronic document; and performing the assigned activities comprises receiving user input comprising comments on the electronic document. The additional workflow participants are identified by one or more corresponding e-mail addresses.

Particular embodiments of the invention can be implemented to realize one or more of the following advantages. Users can send electronic documents to each other without the expertise which may be required to configure and operate a centralized workflow server. Users can send the electronic documents to outsiders without needing to configure a server to recognize the outsiders. An e-mail address can be enough to identify a user. No network connection is required to route electronic documents, as the electronic documents can be transported on portable media. Roles can be assigned to users to minimize redundancy in identifying users. Workflows need not be predefined by the initiating user and can be created on an ad hoc basis by other users in the workflow. Workflows can be reused automatically from older similar electronic documents. Workflow information can be self-contained as metadata inside an electronic document.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
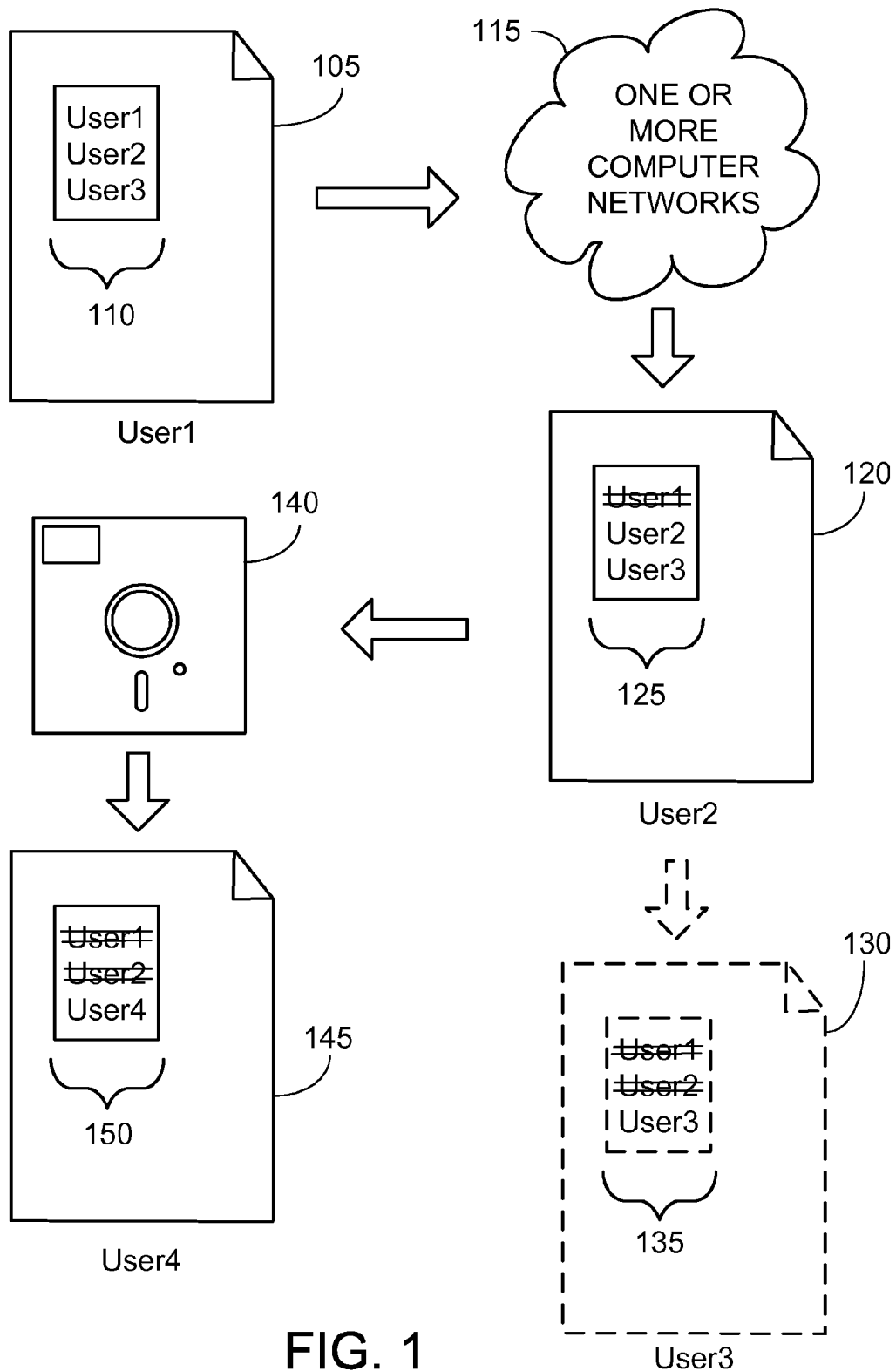
FIG. 1 is an illustration of a workflow.

FIG. 1 is an illustration of a workflow. A workflow defines a process of routing an electronic document 105 between users or computer programs. The workflow is flexible and can be changed by any of the users. Along the way, one of the users can change the routing of the document so that it goes to a different user than the initiating user intended. The electronic document can be any kind of digital data. Examples include a word processing document, a spreadsheet, a CAD drawing, a bitmap image, a vector drawing, an Adobe® PDF document, an Adobe PDF/XFA form, and an Adobe PDF/AcroForm form, available from Adobe Systems, of San Jose, Calif. An electronic document does not necessarily correspond to a file. An electronic document may be stored in a portion of a file that holds other documents, in a single file dedicated to the document in question, or in multiple coordinated files. Workflow information can be stored in the electronic document as metadata, for example XML metadata in the header of a PDF file. The workflow information is not normally visible to the users. The workflow information can be attached to existing native file formats by creating an aggregate file which encloses native files and includes a metadata catalog. Commonly assigned U.S. patent application Ser. Nos. 11/262,018 and 11/262,138 filed Oct. 28, 2005, which are incorporated by reference, disclose such an aggregate file format.

In this example, User One wishes to send an electronic document 105 to User Two and User Three. User One adds workflow information 110 to the electronic document 105. The workflow information 110 includes a schedule of users who will receive the electronic document as well as users who have already handled the document. The workflow information indicates that User One is initiating the workflow, and then User Two will receive the document, and then User Three will receive the document. This is an example of how the workflow information 110 can be represented in XML:

```
<routinginformation>
  <pastparticipants>
    <participant>
      <name>User One</name>
      <address>userone@adobe.com</address>
    </participant>
  </pastparticipants>
  <futureparticipants>
    <participant>
      <name>User Two</name>
      <address>usertwo@adobe.com</address>
    </participant>
    <participant>
      <name>User Three</name>
      <address>userthree@adobe.com</address>
    </participant>
  </futureparticipants>
</routinginformation>
```

The workflow information 110 can be represented visually as a representation of a paper routing slip, which is referred to as a virtual routing slip. Using the workflow information 110, the electronic document 105 is sent through a computer network 115 to User Two. For example, the electronic document can be routed by sending it through an e-mail server to an e-mail address indicated in XML formatted routing information, such as usertwo@adobe.com for User Two. Alternatively, the electronic document can be posted on a collaboration server, e.g., an Adobe Live Cycle server, available from Adobe Systems Incorporated, of San Jose, Calif., using whatever user identifier the collaboration server uses to deliver electronic documents. The collaboration server could operate by e-mail address (e.g., usertwo@adobe.com) or user name (e.g., User Two). Other methods of routing the electronic document include posting the electronic document on a web server, in which case WebDAV usernames can be used (e.g., usertwo@adobe.com), or sending the electronic document across a peer-to-peer network, in which case e-mail addresses (e.g., usertwo@adobe.com) can be used.

When User Two views the electronic document 120, the workflow information 125 indicates that the electronic document 120 already passed through the possession of User One and that User Three is scheduled to receive the electronic document 120 next. If User Three were to receive the electronic document 130, User Three would see in the workflow information 135 that Users One and Two had handled the document. However, in this example, User Two exercises the power to reassign the participants in the workflow. Rather than routing the electronic document 120 to User Three, User Two causes the electronic document to be routed to User Four. User Two updates the routing information 125 and then saves the electronic document 120 to a floppy disk 140 or other portable medium and physically hands the floppy disk 140 to User Four. This is an example of how the updated workflow information 125 can be represented in XML:

```
<routinginformation>
  <pastparticipants>
    <participant>
      <name>User One</name>
      <address>userone@adobe.com</address>
    </participant>
    <participant>
      <name>User Two</name>
      <address>usertwo@adobe.com</address>
    </participant>
  </pastparticipants>
  <futureparticipants>
    <participant>
      <name>User Four</name>
      <address>userfour@adobe.com</address>
    </participant>
  </futureparticipants>
</routinginformation>
```

Upon opening the electronic document 145, User Four is able to read the workflow information 150 to see that User One and User Two had handled the document, and that User Four is now scheduled to have the document. For example, User Four can examine the virtual routing slip to see the names of User One, User Two, and User Four, with the names of the first two crossed off.

In this example, each workflow participant merely sent the document to another workflow participant. The workflow information could also include instructions to the workflow participants to change the document in some way. These instructions are called assigned activities.

The workflow information could be used to instruct each user to add comments to the document. For example, a technical writer may send a draft of a paper to an engineering group to solicit comments. If the writer sends the draft to all the engineers simultaneously, all the engineers in the group can review the draft simultaneously. The assigned activity would be reviewing the electronic document.

The workflow information could alternatively be used to instruct each user to approve or reject the document. For example, company policy might dictate that several layers of management must approve a purchase order request. The managers in the workflow would then be assigned the activity of approving the electronic document. The initiating workflow participant can either send a preexisting electronic document, or fill out a form and send the form. An example of XML including assigned activities could be:

```
<routinginformation>
  <pastparticipants>
    <participant>
      <name>User One</name>
      <address>userone@adobe.com</address>
      <activity>initiate</activity>
    </participant>
    <participant>
      <name>User Two</name>
      <address>usertwo@adobe.com</address>
      <activity>attach</activity>
    </participant>
  </pastparticipants>
  <futureparticipants>
    <participant>
      <name>User Four</name>
      <address>userfour@adobe.com</address>
      <activity>approve</activity>
    </participant>
  </futureparticipants>
</routinginformation>
```

The workflow information could be used to instruct users to fill out a form, either sequentially or simultaneously. A budget spreadsheet is an example of a document that might be passed around a company department and edited sequentially by workflow participants. Sending the electronic document to the workflow participants sequentially allows each workflow participant to build on the work of the previous participants. Sending the electronic document to all workflow participants simultaneously is useful if the user is seeking a response to the user's own work, rather than the work of previous workflow participants. A personal income tax form is an example of a form that might be sent out simultaneously to several users, filled out independently, and returned to the human resources department of a company. The human resources department could then use software to automatically extract the tax information from the forms and save it to a database or a comma-separated variable text file listing the data from each form.

The workflow information could be used to instruct users to attach files to the electronic document, for example, to attach scanned receipts to a travel reimbursement request. The assigned activity would then be attaching files to the electronic document. In one implementation, the aggregate file format disclosed in commonly assigned U.S. patent application Ser. Nos. 11/262,018 and 11/262,138 filed Oct. 28, 2005, which are incorporated by reference, can be used to attach files to the document. To the user, it would appear that the user is adding pages to a preexisting document.

The workflow information could also be used to instruct users to perform a combination of activities. For example, a secretary may create a travel reimbursement request, which may be sent to the traveler to fill in the dollar amounts, then sent to the boss for approval, and finally sent to the accounting department for disbursement. The traveler's assigned activity would be filling in a form and the boss's assigned activity would be to approve the electronic document.

Figure 2:
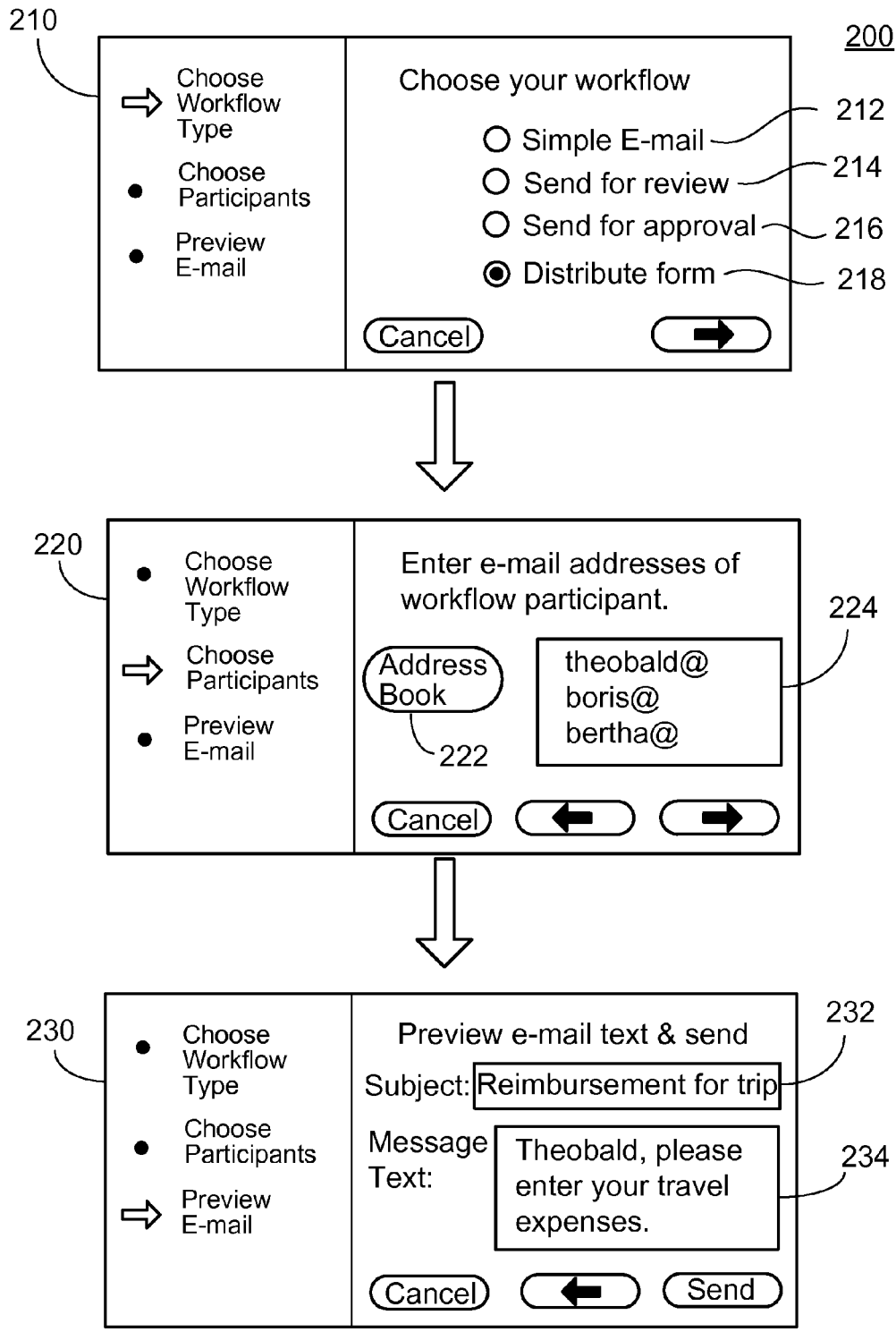
FIG. 2 is an illustration of a user interface for initiating a workflow.

FIG. 2 is an illustration of a user interface for initiating a workflow. In one implementation, the user interface is presented by a software application capable of displaying and modifying electronic documents. The user can route an electronic document to one or more participants by initiating a workflow. In one implementation of a software application displayed on a client, the user initiates the workflow through user interfaces 210, 220, and 230. The user can choose between simply sending the electronic document with no assigned activity 212, sending the electronic document for review to solicit comments 214, sending the electronic document for approval 216, and distributing a form for data collection 218. In this illustrated implementation, sending the electronic document for approval 216 sends it sequentially, while the other assigned activities send the electronic document to all workflow participants simultaneously. The example in FIGS. 2-8 uses a sequential form distribution for illustrative purposes. Other workflows are possible, including sending the electronic document to some workflow participants simultaneously and to other workflow participants sequentially. An engineer might send a design drawing to a supervisor for approval, and then after the supervisor approves the design drawing, send the design drawing to several customers simultaneously for comments.

The next user interface 220 contains a box 224 to list the workflow participants. The workflow participants include people who will receive the electronic document, as well as any computer programs which will process the document automatically. In this example the box 224 lists e-mail addresses for three people, Theobald Traveler, Boris Boss, and Bertha Beancounter. This example does not list any computer programs, although a computer program could be named by an e-mail address. A computer program could extract data from the electronic document and store it into a database, such as a database for an accounting or personnel management program. The user interface 220 can contain an address book button 222, to give the user the flexibility of typing e-mail addresses into the box 224 or selecting them from an address book 222. In one implementation, all the workflow participants are assigned the same activity, which was specified in the first user interface 210.

In another implementation, the same role can be listed several times in a workflow. A role is a placeholder for a workflow participant. At some point during the workflow, the role is bound to a workflow participant, which means that if the same role occurs again in the same workflow, that workflow participant will automatically be sent the electronic document. For example, a workflow might be "junior engineer, senior engineer, junior engineer," reflecting that the junior engineer will create the electronic document and then edit it in response to the senior engineer's comments. The role ensures that the same junior engineer who wrote the electronic document would later edit it. The role feature is useful when workflows are reused for several electronic documents.

If workflow participants are identified by e-mail addresses, the user can send the electronic document by e-mail. For the convenience of the recipient or recipients the user can specify a subject line and body text for the e-mail. The last user interface allows the user to write a subject line and body text for an e-mail by providing an e-mail subject line field 232 and an e-mail body field 234.

In another implementation, workflows can be automatically reused from another electronic document if the electronic document seems similar in content or name. If the workflow information is stored as XML metadata, the XML metadata can be copied from the old electronic document into the new electronic document. For example, a user may have a travel reimbursement form which the user fills out on a monthly basis then sends to the user's boss for approval. The implementation can detect that the travel reimbursement form has the same name as a previous travel reimbursement form and automatically fill in the user's boss as a workflow participant, assigned the activity of approving the form. The electronic document can be routed immediately by sending it through an e-mail server, posting it on a collaboration server, e.g., an Adobe Live Cycle server, available from Adobe Systems Incorporated, of San Jose, Calif., posting it on a web server, or sending it across a peer-to-peer network. The peer-to-peer network can use operating system services to communicate among peers, such as the NetBIOS local networking protocol or the People Near Me peer-to-peer engine built into the Windows Vista operating system, or the peer-to-peer network can use a library proprietary to a software client for electronically routing documents. Optionally, the user can have the option of not routing the electronic document immediately. Instead, an Add Routing Slip button can save the workflow information to the user's copy of the electronic document, allowing the user to transfer the electronic document manually, such as on a portable medium.

Figure 3:
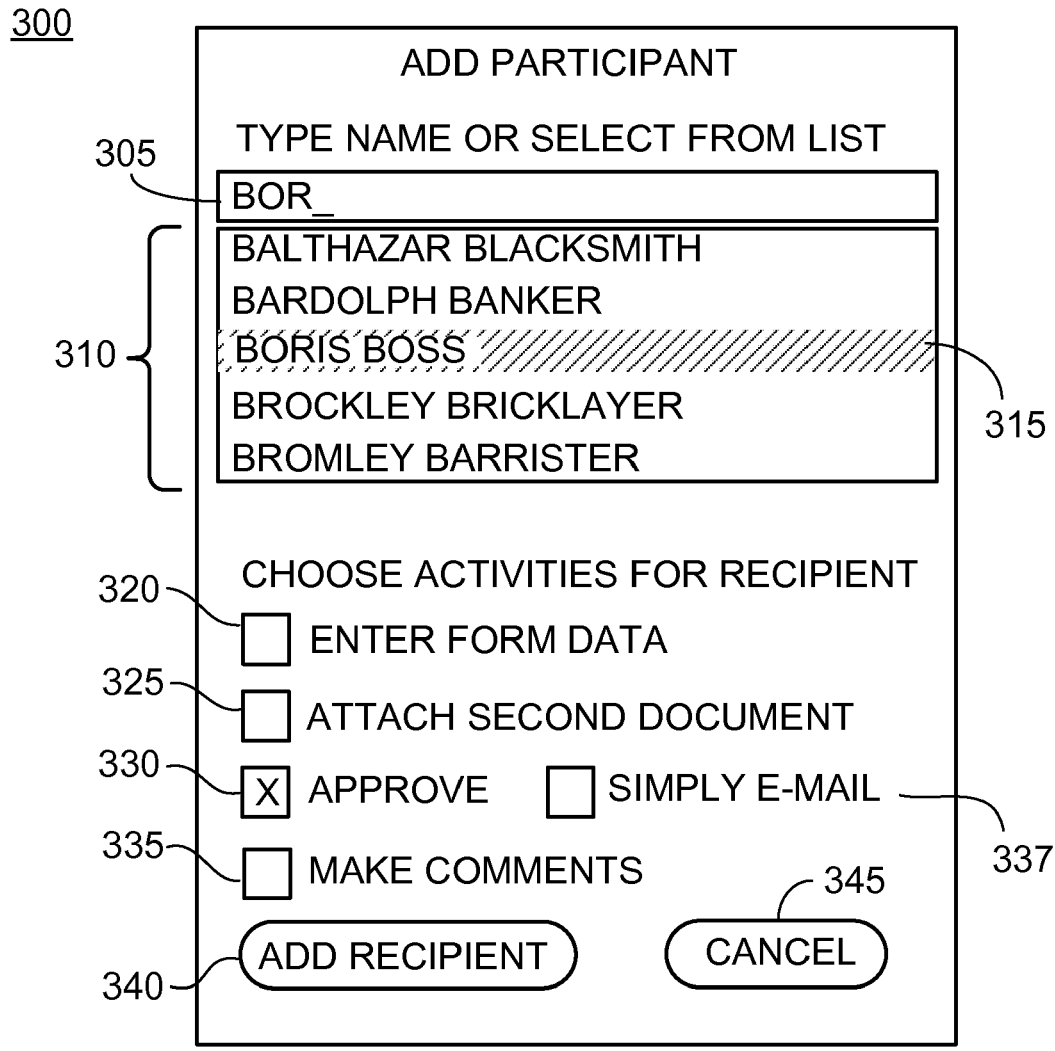
FIG. 3 is an illustration of a user interface for adding a recipient to a workflow.

FIG. 3 is an illustration of a user interface for adding a recipient to a workflow. While FIG. 2 depicts a user interface 220 for adding workflow participants who all perform the same activity, FIG. 3 illustrates an alternative user interface for adding a recipient where different workflow participants can have different activities. The user adds workflow participants and activities through a user interface 300. The user interface 300 can have a name or address field 305 for the user to enter the name or address of a workflow participant. The user interface 300 can also allow the user to select the workflow participant from an address book 310, and if a partial name is entered in the name or address field 305 the matching names 315 can be selected automatically in the address book 310. One or more activities can be chosen for the workflow participant, such as entering data into a form 320, if the electronic document is a form, attaching other electronic documents to the electronic document 325, approving the electronic document 330, or making comments on the electronic document 335. The user can confirm the choice of activity and recipient by selecting (e.g., with a mouse click) an Add Recipient button 340 or can change his mind and decide not to add a workflow participant by selecting a Cancel button 245. In this example, the user is adding Boris Boss as a workflow participant and assigning him the activity of approving the electronic document. After adding a recipient, the workflow information in the electronic document is modified. For example, if the workflow information is represented in XML, a <participant> element can be added for Boris Boss.

Figure 4:
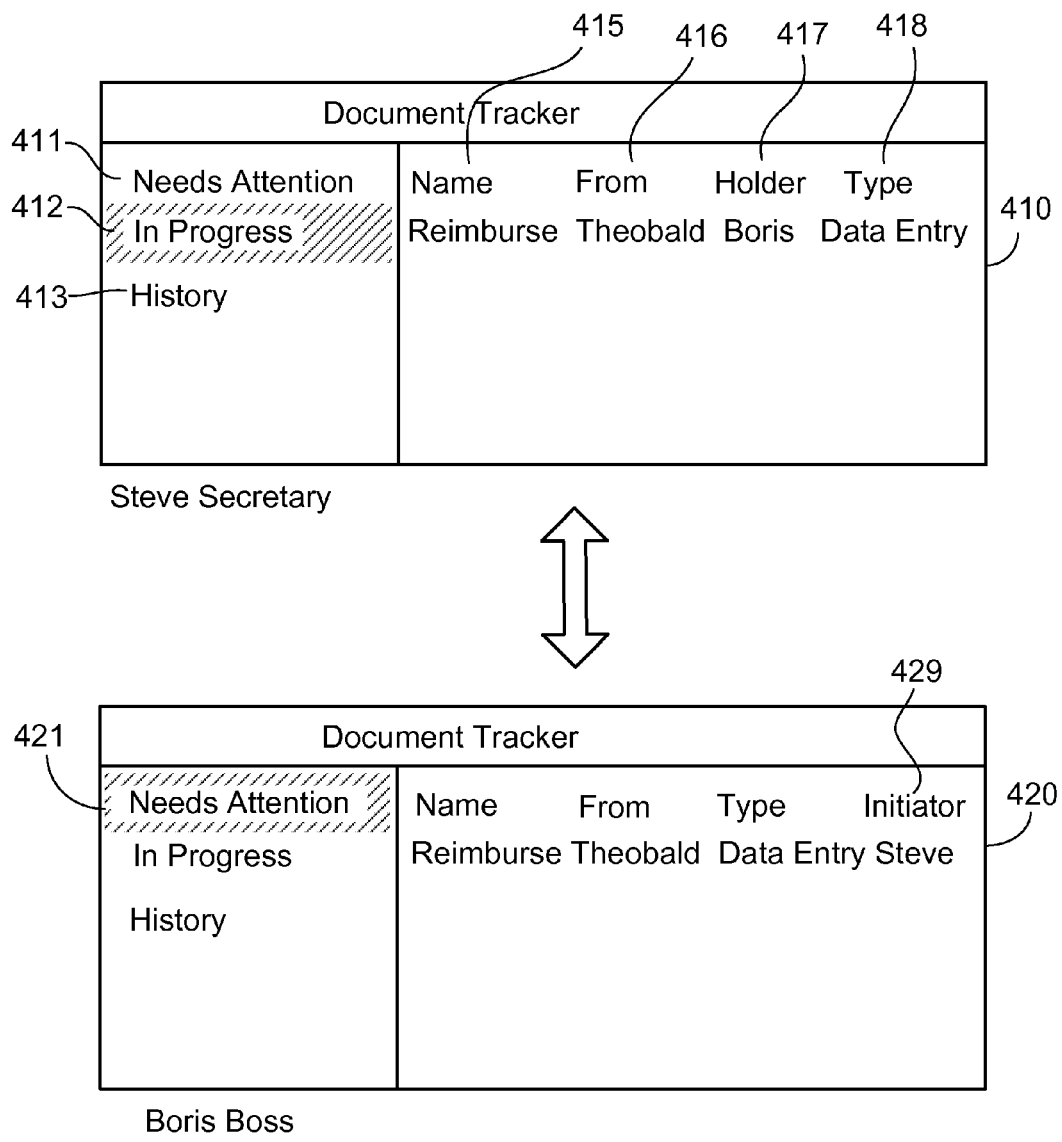
FIG. 4 is an illustration of a user interface for monitoring a workflow.

FIG. 4 is an illustration of a user interface for monitoring a workflow. A document tracker 410 can show electronic documents with workflow information that need attention 411, electronic documents that are in progress 412, and older electronic documents that have been archived 413. In this example, the document tracker 410 is presented to workflow participant Steve Secretary.

The electronic documents that are in progress 412 are those whose workflows have been initiated but have not completed. The document tracker 410 can show the name 415 of each in-progress electronic document, as well as who the last person to send the electronic document was 416 and who currently holds the electronic document 417. The document tracker can also display the activity or activities 418 of the workflow participants. The document tracker can maintain this information by communicating with a central server such as an Adobe Live Cycle server, a smaller workgroup server, a server over the public Internet at an application service provider, or peers on a local-area network. The document tracker can query one or more servers to learn the status of various documents. In a peer-to-peer setting, it is possible to use broadcast or multicast network packets to inform peers of changes in the status of various documents. Alternatively, the peers can self-organize into a tree in order to minimize the amount of network traffic. In this example, Steve Secretary created a travel reimbursement for Theobald Traveler. After Theobald Traveler handled the electronic document, it was sent to Boris Boss.

The document tracker can also show electronic documents that need attention. In this example, a needs-attention list 421 in the document tracker 420 user interface is presented to participant Boris Boss. The needs-attention list 421 has additional information of who initiated the electronic documents 429. In this example, Boris Boss has the electronic document, so it appears in his needs-attention list 420.

An archive of older electronic documents can hold electronic documents that have been returned to the initiating user after the other workflow participants have handled the document. For example, an employee who submits a form to request paid time off may want the form returned to him, both for archival purposes and to know that the request was actually granted. In one implementation, the archive of older documents 413 is rapidly searchable through the use of a trie data structure.

Figure 5:
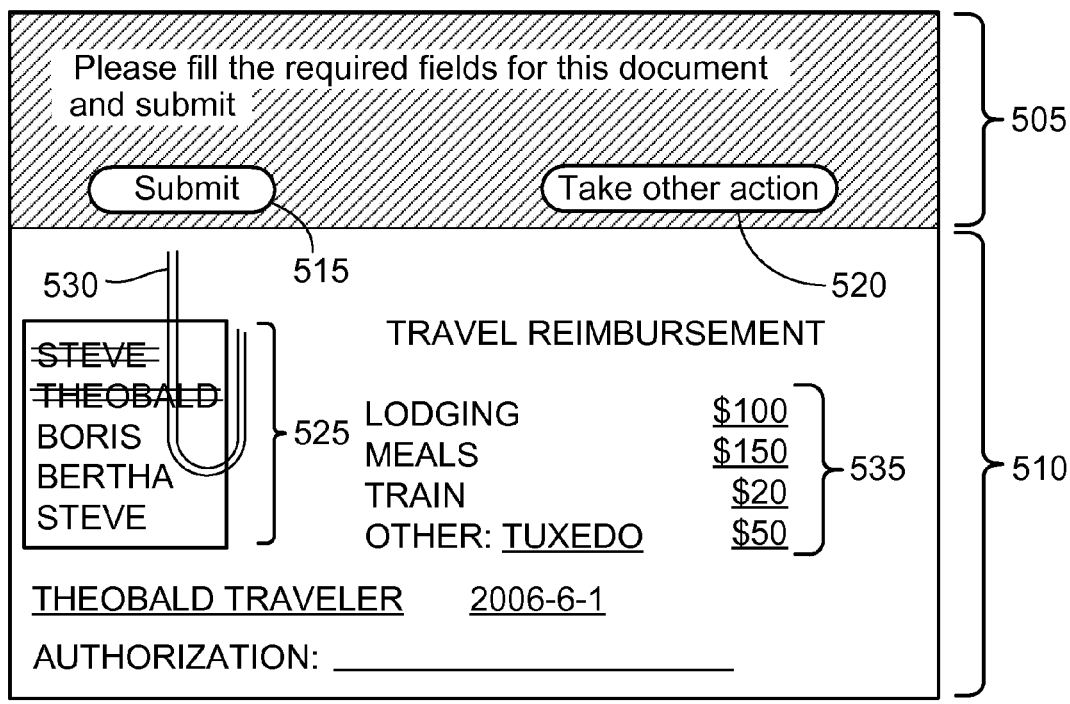
FIG. 5 illustrates how an electronic document with embedded workflow information and an activity assigned to a user may be displayed to the user.

FIG. 5 illustrates how an electronic document with embedded workflow information and an activity assigned to a user may be displayed to the user. In one implementation, the electronic document 510 is displayed with a message 505 to the user. The message 505 can inform the user what activity is assigned to the user. Here, the user is Boris Boss, and his assigned activity is filling out the form to add his authorization for a travel reimbursement request.

The user can perform an activity and confirm with a confirmation button 515. For example, if, as illustrated in FIG. 5, the assigned activity is filling out a form, the user can press the confirmation button to submit the electronic document to the next workflow participant. If the assigned activity is approving a document, attaching electronic documents, or making comments, the user can press the confirmation button to indicate that the user has approved the form or finished attaching files, or making comments. The user can press the Take Other Action button 520 if the user does not wish to perform the assigned activity.

An on-screen virtual routing slip 525 can list the past and future workflow participants and indicate whether the current user is assigned a present activity. In this example, the routing slip 525 indicates that Steve Secretary and Theobald Traveler are past workflow participants, because they already handled the electronic document and their names are crossed out. Boris Boss is listed next on the routing slip 525, and so even without the user message 505 it can be inferred that Boris Boss has an assigned activity. Bertha Beancounter and Steve Secretary are future workflow participants, because their names appear after Boris Boss's name on the routing slip 525. It is possible for a workflow participant to be both a past workflow participant and a future workflow participant, as Steve Secretary is in this example.

A paperclip icon 530 can indicate that files have been attached to the electronic document 510. The electronic document can be a form, in which case the electronic document 510 can be displayed with previously entered data 535. In this example, the electronic document 510 has attached files and previously entered data 535. This is because Theobald Traveler already handled the electronic document, indicated by the routing slip 525, and his assigned activity was to enter form data, see FIG. 2.

Figure 6:
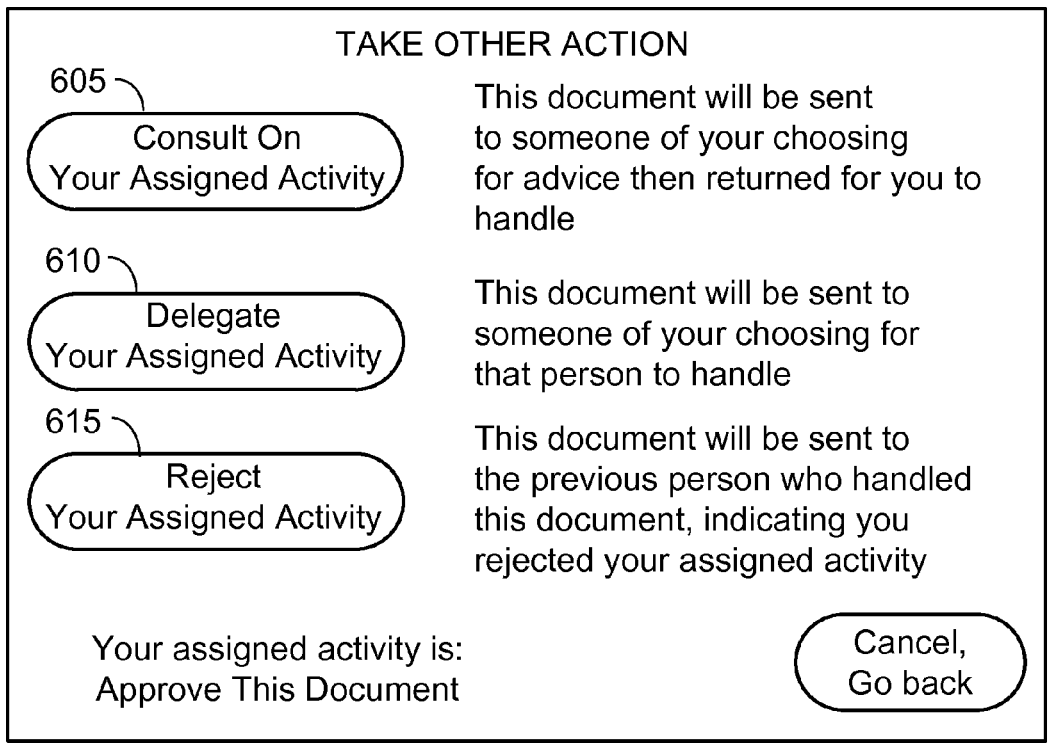
FIG. 6 is an illustration of a user interface for consulting on, delegating or rejecting an activity assigned to the user.

FIG. 6 is an illustration of a user interface 600 for consulting on, delegating or rejecting an activity assigned to the user. If the user chooses not to perform the assigned activity, the user can choose to take other action by selecting the Take Other Action button 520.

In one implementation, selecting the Take Other Action button 520 brings up a user interface 600 giving three selection options: a button for consulting on the assigned activity 605, a button for delegating the assigned activity 610, and a button for rejecting the assigned activity 615.

If the user selects consulting on the assigned activity 605, the electronic document is sent to someone else, called a consultant, and then returned to the user. If the workflow information is saved in the electronic document as XML, a consultation by Boris Boss to Crispin Consultant could be represented as follows, omitting activities for brevity:

```
<routinginformation>
    <pastparticipants>
        <participant>
            <name>Steve Secretary</name>
            <address>steve@adobe.com</address>
        </participant>
        <participant>
            <name>Theobald Traveler</name>
            <address>theobald@adobe.com</address>
        </participant>
    </pastparticipants>
    <futureparticipants>
        <participant>
            <name>Boris Boss</name>
            <address>boris@adobe.com</address>
            <participant type="consultant">
                <name>crispin consultant</name>
                <address>crispin@adobe.com</address>
            </participant>
        </participant>
        <participant>
            <name>Bertha Beancounter</name>
            <address>bertha@adobe.com</address>
        </participant>
        <participant>
            <name>Steve Secretary</name>
            <address>steve@adobe.com</address>
        </participant>
    </futureparticipants>
</routinginformation>
```

The consultant may or may not already be a workflow participant. In one implementation, the user can choose a consultant from an address book similar to the address book 315 in FIG. 3. For example, if the user's assigned activity is filling data into a form, the user may lack knowledge of the data necessary to fill the form completely, and so may consult on the form by sending it to someone who knows the missing data. In this example, the user may want to double-check the consultant's work, or may want to fill in additional information after the consultant, and so the user would choose to consult on the form so it would be returned to the user after the consultant handles it. Optionally, the consultant can herself choose to consult on the electronic document, in which case the electronic document would be sent to the second consultant, then back to the first consultant, then back to the user. A consultant likewise can optionally delegate or reject the assigned activity.

If the user selects delegating the assigned activity 610, the electronic document is sent to someone else, called a delegate, and is not returned to the user. If the workflow information is saved in the electronic document as XML, a consultation by Boris Boss to Dweezil Delegate could be represented as follows, omitting activities for brevity:

```
<routinginformation>
    ...
    <futureparticipants>
        <participant>
            <name>Boris Boss</name>
            <address>boris@adobe.com</address>
            <participant type="delegate">
                <name>Dweezil Delegate</name>
                <address>dweezil@adobe.com</address>
            </participant>
        </participant>
        ...
</routinginformation>
```

The delegate may or may not already be a workflow participant. Optionally, the user can choose a delegate from an address book similar to the address book 315 in FIG. 3. For example, the user may be too overworked to do the assigned activity and therefore forward it to a subordinate for handling. Optionally, a delegate can consult on, delegate, or reject the assigned activity.

If the user selects rejecting the assigned activity 615, the electronic document is sent back to the previous workflow participant. The rejection can be interpreted either as a substantive rejection, or that the workflow participant simply does not want to do the assigned activity. For example, if Boris Boss's approval is necessary for Theobald Traveler to be reimbursed, Boris Boss's rejection may as a practical matter mean that Theobald will not be reimbursed. But if Boris Boss were the wrong recipient, if for example the wrong name were picked out of an address book, Theobald could change the workflow to include the correct recipient and resend the electronic document.

Figure 7:
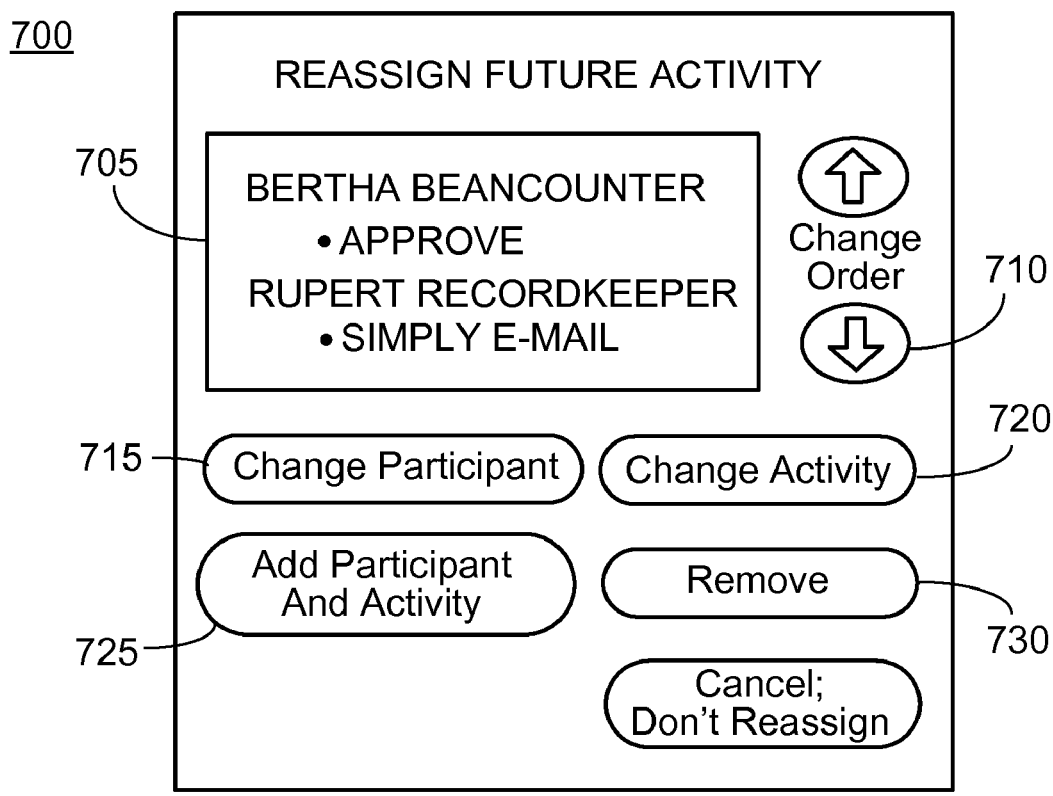
FIG. 7 is an illustration of a user interface for reassigning a future activity.

FIG. 7 is an illustration of a user interface 700 for reassigning a future activity. The user interface 700 gives the user total control over future participants and future activities in the workflow. The control the user has over routing an electronic document is similar to the control the user would have over a paper document. Just as the user could scratch out a paper routing slip and write a new one, the user can reorder recipients, remove recipients, change assigned activities, or add new recipients.

The user interface can have a box 705 of future participants and future activities. The user interface can have a button for changing the participant assigned to do a particular activity 715 and a button for changing the activity assigned to a participant 720. The user interface can have a button to add a new participant and an assigned activity 725, such as by displaying to the user the user interface 300, see FIG. 3. The user interface can have a button to remove a participant and the assigned activity 730. Change order buttons 710 can be used so that workflow participants receive the electronic document in a different order.

In this example, Boris Boss used the add participant button 725 to add Rupert Recordkeeper after Bertha Beancounter, assigning the activity "simply e-mail" to Rupert. Rupert will be e-mailed the electronic document but will not be assigned any activity. Boris Boss also used the change activity button 720 to change Bertha's activity to approving the electronic document.

Figure 8:
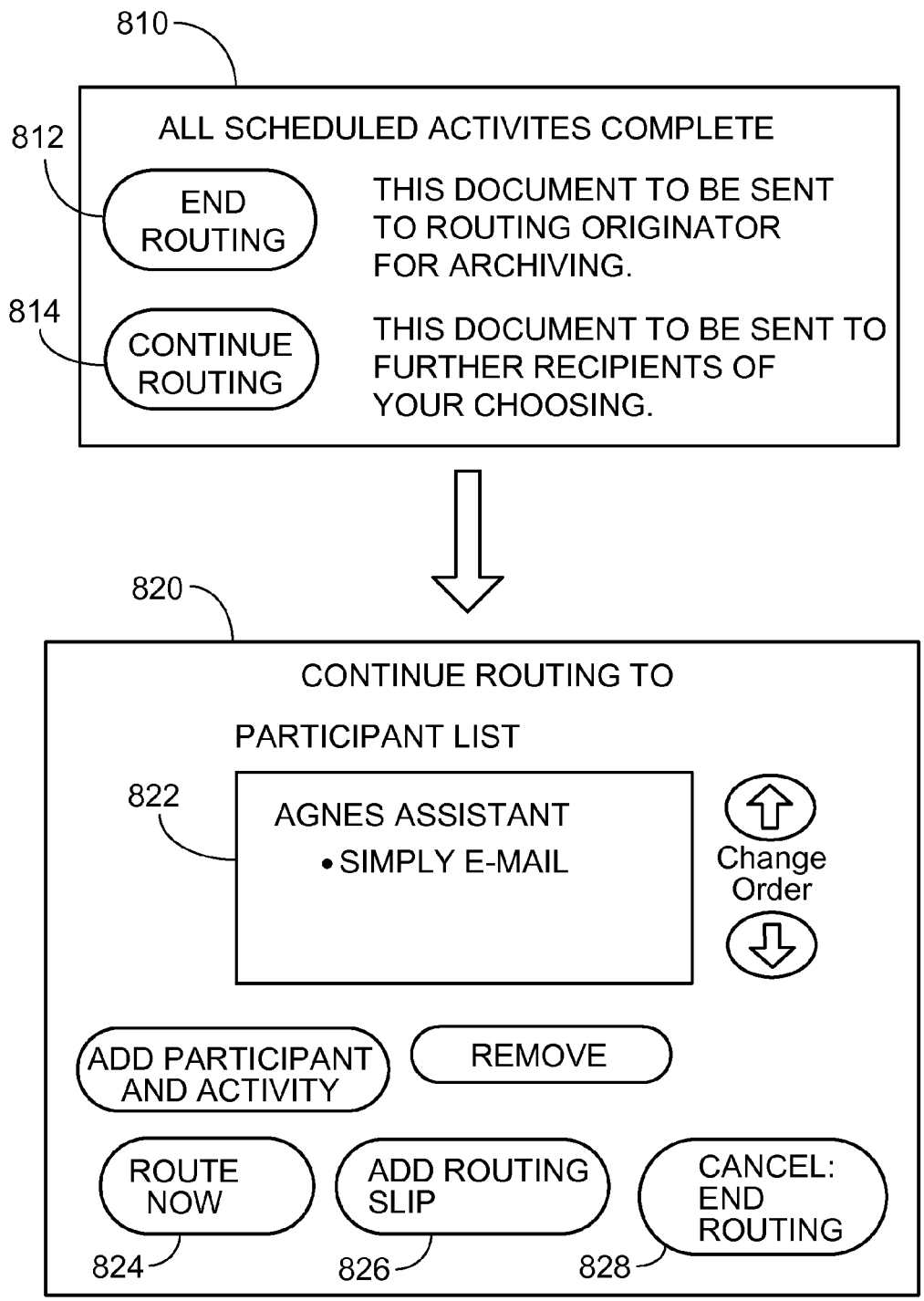
FIG. 8 is an illustration of a user interface for choosing to end or continue a workflow.

FIG. 8 is an illustration of a user interface for choosing to end or continue a workflow. When a workflow finishes, for example, because all of the workflow participants have performed their assigned activities, the last workflow participant can optionally choose to end or continue the workflow through a user interface 810. In one implementation, if the last workflow participant chooses to end the workflow by selecting an End Routing button 812, the electronic document is sent back to the initiator of the workflow, with all of the accumulated changes, comments, approvals, and attached documents. If the last workflow participant chooses to continue the workflow, for example by selecting a Continue Routing button 814, the last workflow participant is prompted to choose additional participants and assigned activities, such as through a user interface 820, and the workflow continues.

The user interface 820 allows a user to choose additional workflow participants and activities. The user interface 820 can have a box 822 of additional workflow participants and activities. In this example, Rupert Recordkeeper was scheduled to be the last workflow participant. He chose to continue the workflow, and then added Agnes Assistant to the workflow, assigned the activity of simply being e-mailed the electronic document with no further instructions. Rupert can immediately send the electronic document with embedded routing information with a Route Now button 824, or save the routing information to the electronic document to manually send the electronic document later with an Add Routing Slip button 826. Rupert can also change his mind about continuing the workflow and instead end the workflow with a Cancel button 828.

The user interface 820 allows a workflow to be constructed on an ad hoc basis. Rather than the initiating user being required to foresee an entire predefined workflow, the initiating user can simply supply the names of one or more workflow participants. These workflow participants can continue the workflow by adding even more workflow participants. The continuation of the workflow can occur many times, resulting in an ad hoc workflow. This ad hoc workflow, after being completed, can be reused as a predefined workflow for other electronic documents.

Figure 9:
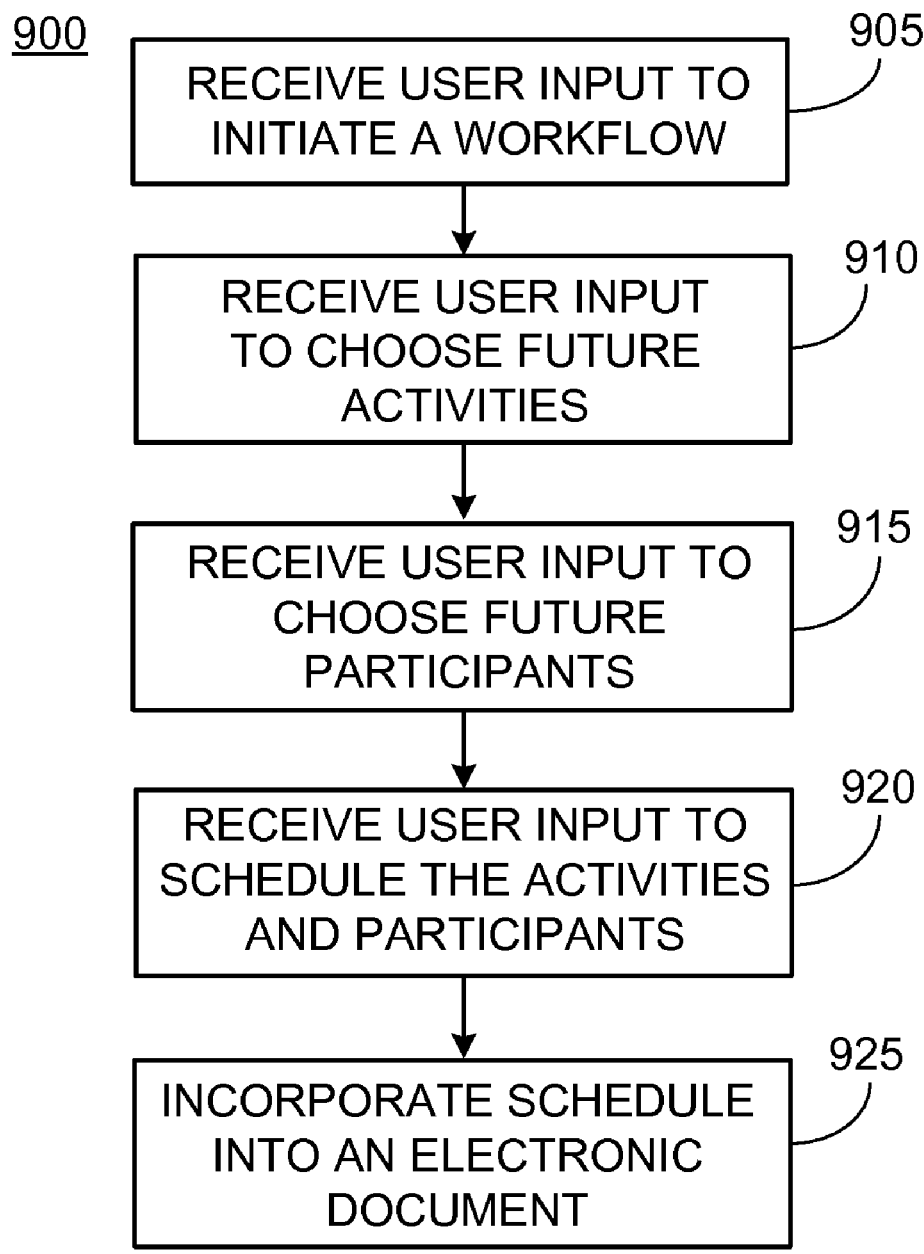
FIG. 9 is a flowchart illustrating a technique for initiating a workflow.

FIG. 9 is a flowchart 900 illustrating a technique for initiating a workflow. The user interacts with a client displaying a user interface, such as software running on a personal computer or a page in a world wide web browser. An example of such client software is Adobe Acrobat, available from available from Adobe Systems, of San Jose, Calif. The client receives user input to initiate a workflow for an electronic document (step 905). The client receives user input to choose future activities (step 910) and future participants (step 915). Examples of steps 910 and 915 are described with reference to user interfaces 210 and 220 of FIG. 2. In one implementation, the user can choose the future activities and future participants in any order. In another implementation, the user chooses the future participants one at a time, and for each participant assigns the future activities, see FIG. 3. The client receives user input to schedule the activities and participants (step 920), resulting in a schedule. In one implementation, the user may choose the future participants in a desired sequence, so that it is unnecessary to separately schedule the activities and participants. The client then incorporates the schedule for the activities and participants into the electronic document (step 925). For example, the schedule may be saved as XML data into an electronic document file.

Figure 10:
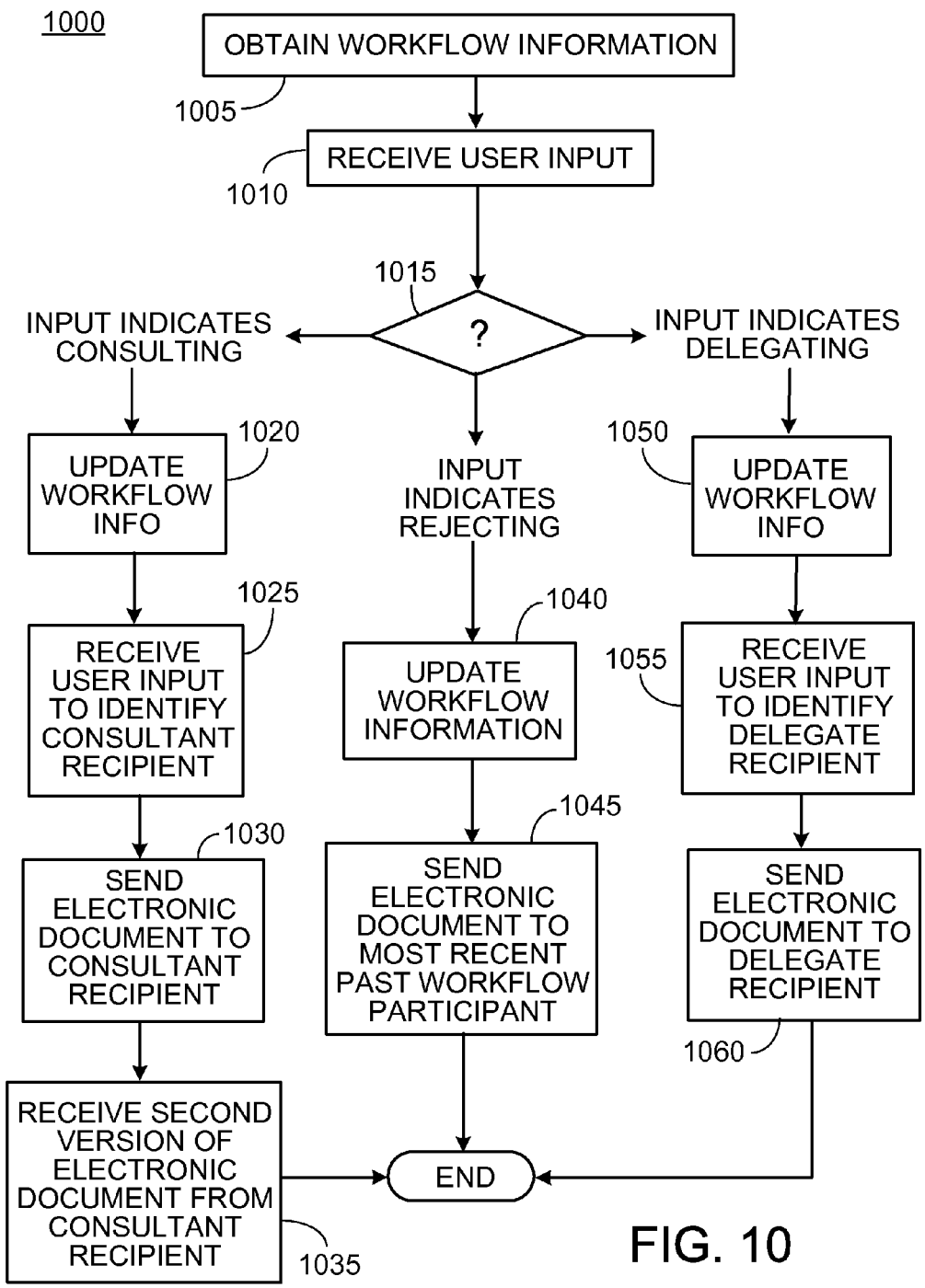
FIG. 10 is a flowchart illustrating a technique for consulting on, delegating, or rejecting an activity assigned to the user.

FIG. 10 is a flowchart 1000 illustrating a technique for consulting on, delegating, or rejecting an activity assigned to the user. The client obtains workflow information from an electronic document (step 1005), for example by reading the electronic document from disk. The client can present the electronic document to the user, for example as in FIG. 5, and inform the user that the user can perform the assigned activity, or consult on, delegate, or reject the assigned activity. The client receives user input (step 1010) and determines whether the user input is a choice of consulting on, delegating, or rejecting the assigned activity (step 1015). For example, the user input may be a mouse click on one of three buttons representing the choices. If the user input is one of the three choices, the workflow information is updated to reflect the consultation (step 1020), delegation (step 1040), or rejection (step 1050).

If the user input reflects that the user consulted on the assigned activity, the client receives user input to identify another person to be a consultant recipient (step 1025), sends the electronic document to the consultant recipient (step 1030), and receives a second version of the electronic document from the consultant recipient (step 1035). The second version includes updated workflow information reflecting that the consultant in some way handled the assigned activity.

If the user input reflects that the user rejected the assigned activity, the client sends the electronic document back to the workflow participant who most recently handled it (step 1045).

If the user input reflects that the user delegated the assigned activity, the client receives user input to identify another person to be a delegate recipient (step 1055) and sends the electronic document to the delegate recipient (step 1060).

In one implementation, the client can update the workflow information (steps 1020, 840) after receiving user input to identify the consultant recipient (step 1025) or delegate recipient (step 1055), so that the audit trail in the workflow information reflects the identity of the consultant or delegate. See discussion above.

Figure 11:
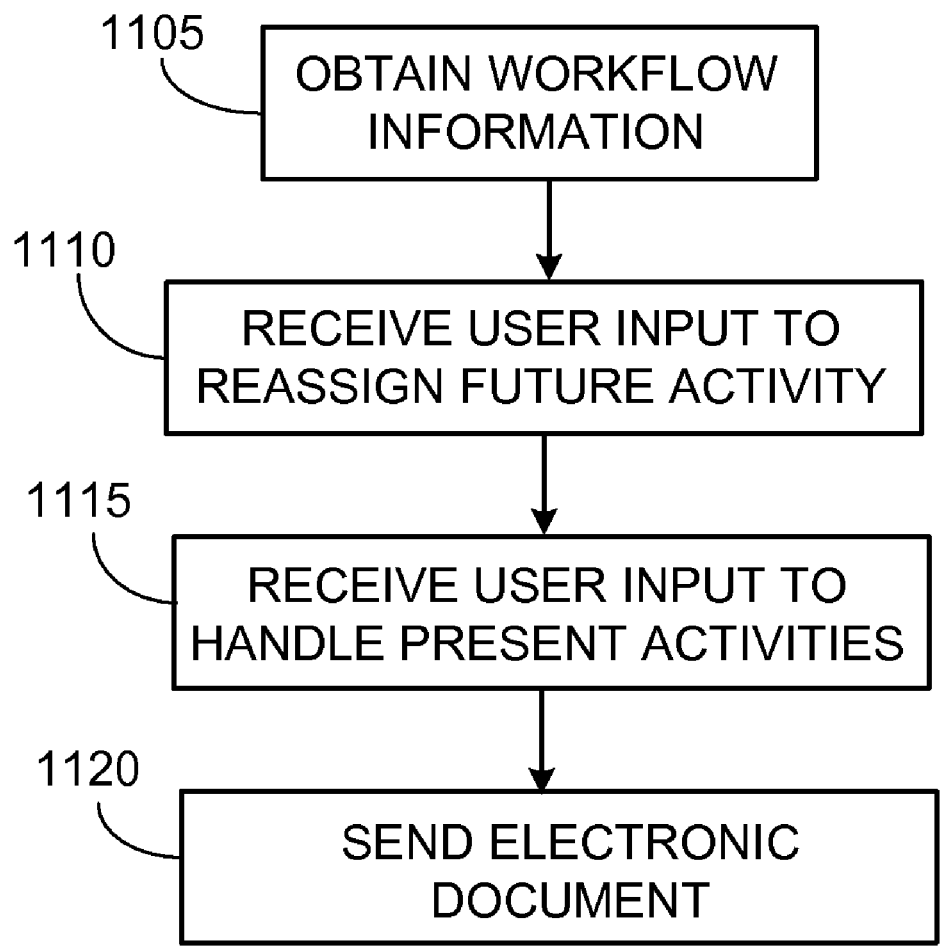
FIG. 11 is a flowchart illustrating a technique for reassigning a future activity.

FIG. 11 is a flowchart 1100 illustrating a technique for reassigning a future activity. The client obtains workflow information from an electronic document (step 1105), and then receives user input to reassign a future activity (step 1110). For one implementation of step 1110, see FIG. 7. Optionally, the client can receive user input to handle present activities assigned to the user (step 1115). For example, the client can receive user input to enter data into a form. Optionally the client can then send the electronic document on to the next workflow participant in the usual way (step 1120).

Figure 12:
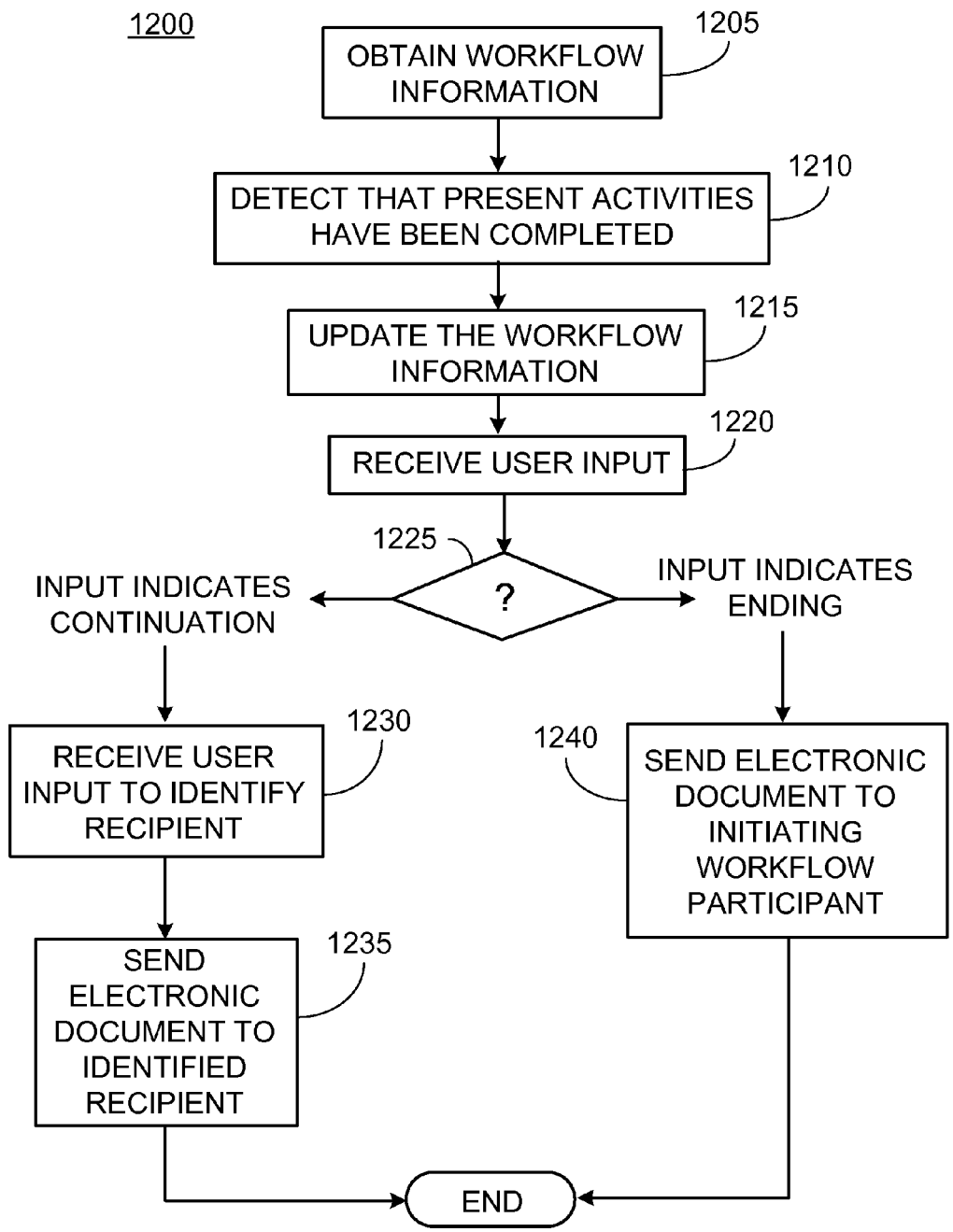
FIG. 12 is a flowchart illustrating a technique for ending or continuing a workflow.

FIG. 12 is a flowchart illustrating a technique for ending or continuing a workflow. The client obtains workflow information from an electronic document (step 1205), then detects that the user has completed all present activities assigned to him (step 1210) and updates the workflow information in the electronic document to reflect that the assigned activities have been completed (step 1215). If there are no more scheduled activities, the client receives user input as to whether the workflow should be ended or continued (step 1220). For an example see the user interface 810 of FIG. 8. The client determines whether the user input indicates ending or continuing the workflow (step 1225). If the user input indicates continuing the workflow, the client receives user input to identify further workflow participants (step 1230), such as through the user interface 820 of FIG. 8, and sends the electronic document to the workflow recipient scheduled to receive the document first (step 1235), such as through e-mail. If the user input indicates ending the workflow, the client sends the electronic document back with all the accumulated changes to the initiating workflow participant (step 1240).

Figure 13:
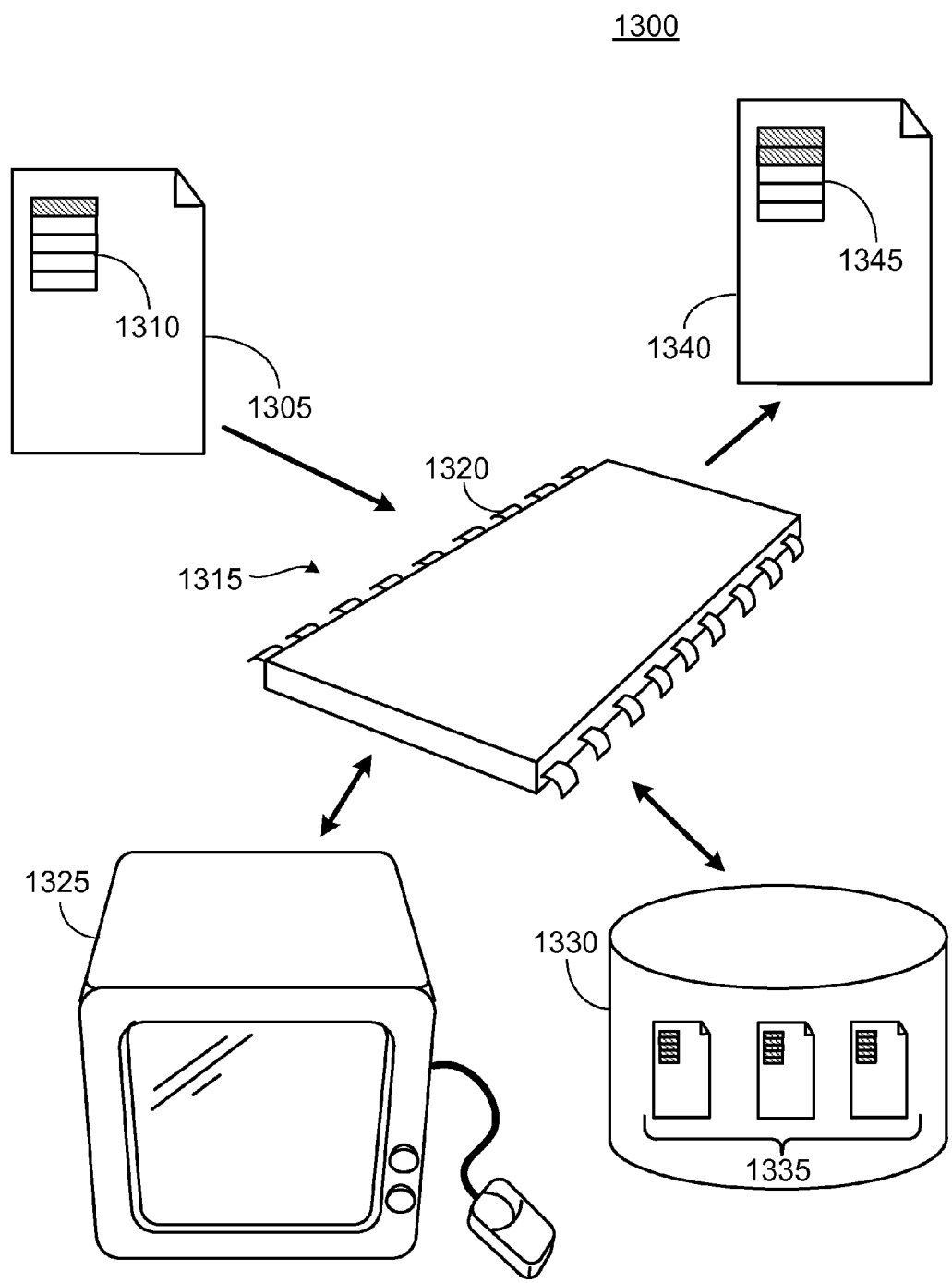
FIG. 13 is a system diagram for a computer processing electronic documents with workflow information.

FIG. 13 is a system diagram for a computer processing electronic documents with workflow information. An electronic document 1305 with embedded routing information 1310 is sent 1315 to a computer. The computer can run Adobe Acrobat software. The electronic document can be sent 1315 through e-mail, HTTP, or a central workflow server like Adobe Live Cycle. The electronic document 1315 can also be transported on a physical medium. The computer communicates with a user through user interface devices 1325 such as a monitor, keyboard, and mouse. The computer can access an archive 1330 of electronic documents 1335, which can be stored on a disk or a network server. After the user handles the electronic document 1305, by input communicated to the processor 1320 through the user interface devices 1325, a new version of the electronic document 1340 is produced, with updated workflow information 1345. The new version of the electronic document 1340 can be sent to other workflow participants or stored in the archive 1330. For example, the Adobe® Acrobat software can use the Messaging Application Programming Interface available from Microsoft Corporation, of Redmond, Wash., to send the new version of the electronic document 1340 to other workflow participants via e-mail.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

We claim:

1. A computer-implemented method comprising:
   receiving directly or indirectly, by a client application at a client device, an electronic document from an initiating workflow participant;
   obtaining, by the client device and without contacting a workflow server device, workflow information from the electronic document, the workflow information pertaining to at least one activity assigned to a user;
   receiving, by the client device and without contacting the workflow server device, user input specifying whether to consult on or delegate the assigned activity;
   updating, by the client device and without contacting the workflow server device, the workflow information in the electronic document to indicate that the assigned activity was consulted on or delegated;
   if the user input indicates consulting on the assigned activity, receiving user input to identify the initiating workflow participant and a consultant, wherein the updating comprises updating by the client device the workflow information in the workflow document to include the identities of the initiating workflow participant and the consultant, wherein the client application sends the electronic document to the consultant based on the identity of the consultant included in the workflow information, and receiving by the client device a second version of the electronic document from the consultant, wherein the second version reflects that the assigned activity has been performed; and
   if the user input indicates delegating the assigned activity, receiving user input to identify a delegate, wherein the updating comprises updating by the client device the workflow information in the workflow document to include the identity of the delegate, and sending, by the client application, the electronic document to the delegate based on the identity of the delegate included in the workflow information.

2. The method of claim 1, wherein the workflow information is participant declarations and activity declarations stored as embedded routing metadata in the electronic document.

3. The method of claim 1, further comprising presenting the workflow information to the user.

4. The method of claim 1, wherein at least one workflow participant is an initially unbound role, and the method further comprises:
   subsequently binding the role to an actual workflow participant, whereby all instances of that role in the electronic workflow are assigned to the same actual workflow participant.

5. The method of claim 1, further comprising:
   after sending the electronic document, transmitting a status notification that the electronic document has been sent and to whom to at least one of: a local area network server, an application service provider, or peers in a network.

6. A computer program product, the computer-program product including a non-transitory computer-readable storage medium having computer-executable instructions stored thereon, the instructions when executed by a computer enabling the computer to perform operations comprising:
- receiving directly or indirectly, by a client application at a client device, an electronic document from an initiating workflow participant;
- obtaining, by the client device and without contacting a server device, workflow information from the electronic document, the workflow information pertaining to at least one activity assigned to a user;
- receiving, by the client device and without contacting the server device, user input specifying whether to consult on or delegate the assigned activity;
- updating, by the client device and without contacting the server device, the workflow information in the electronic document to indicate that the assigned activity was consulted on or delegated;
- if the user input indicates consulting on the assigned activity, receiving user input to identify the initiating workflow participant and a consultant, wherein the updating comprises updating by the client device the workflow information in the workflow document to include the identities of the initiating workflow participant and the consultant, wherein the client application sends the electronic document to the consultant based on the identity of the consultant included in the workflow information, and receiving by the client device a second version of the electronic document from the consultant, wherein the second version reflects that the assigned activity has been performed; and
- if the user input indicates delegating the assigned activity, receiving user input to identify a delegate, wherein the updating comprises updating by the client device the workflow information in the workflow document to include the identity of the delegate, and sending, by the client application, the electronic document to the delegate based on the identity of the delegate included in the workflow information.

7. The computer program product of claim 6, wherein the workflow information is participant declarations and activity declarations stored as embedded routing metadata in the electronic document.

8. The computer program product of claim 6, further comprising instructions for presenting the workflow information to the user.

9. The computer program product of claim 6, wherein at least one workflow participant is an initially unbound role, and the computer program product further comprises instructions for:
- subsequently binding the role to an actual workflow participant, whereby all instances of that role in the electronic workflow are assigned to the same actual workflow participant.

10. The computer program product of claim 6, further comprising instructions for:
- after sending the electronic document, transmitting a status notification that the electronic document has been sent and to whom to at least one of: a local area network server, an application service provider, or peers in a network.

* * * * *